Patented Feb. 8, 1949

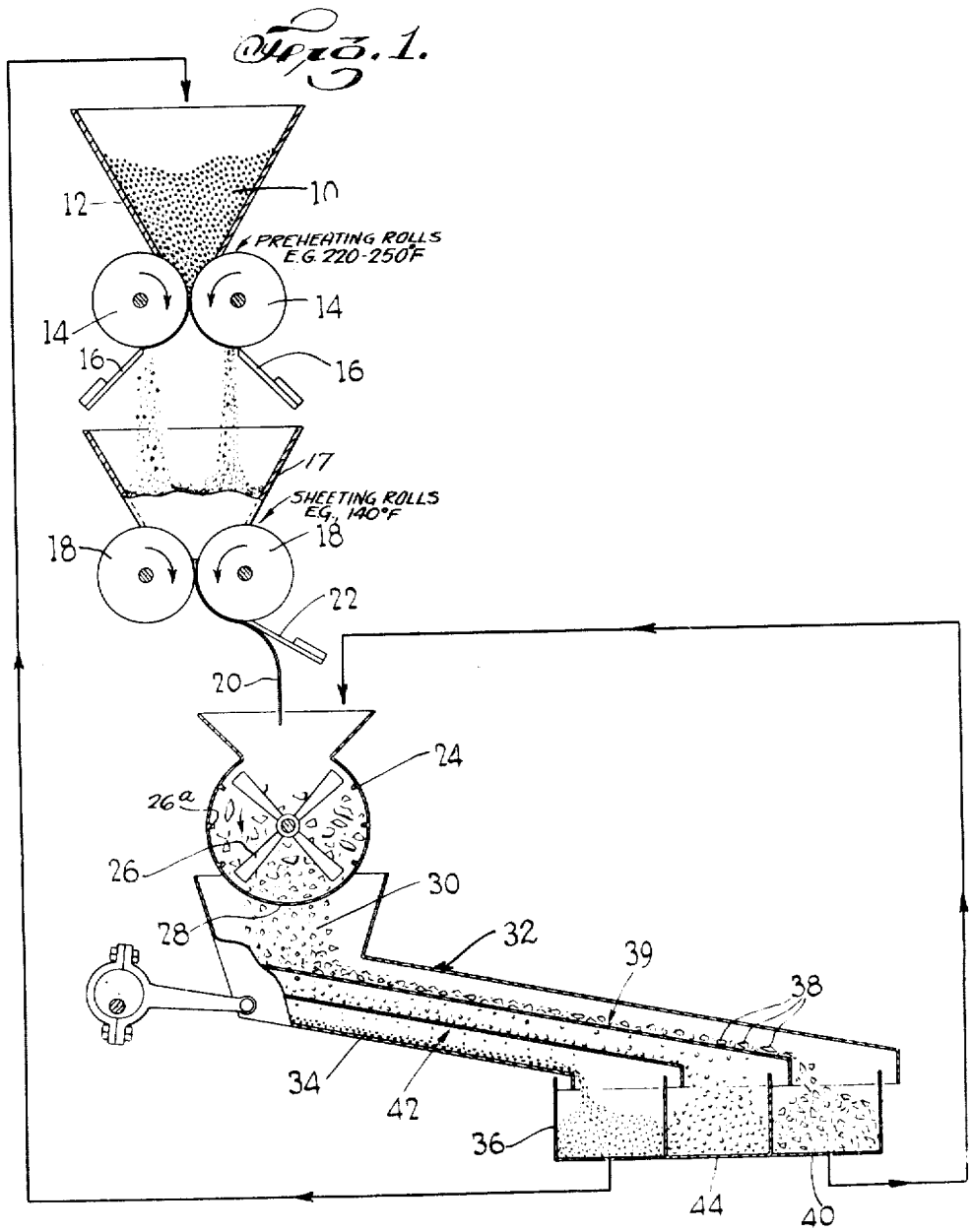

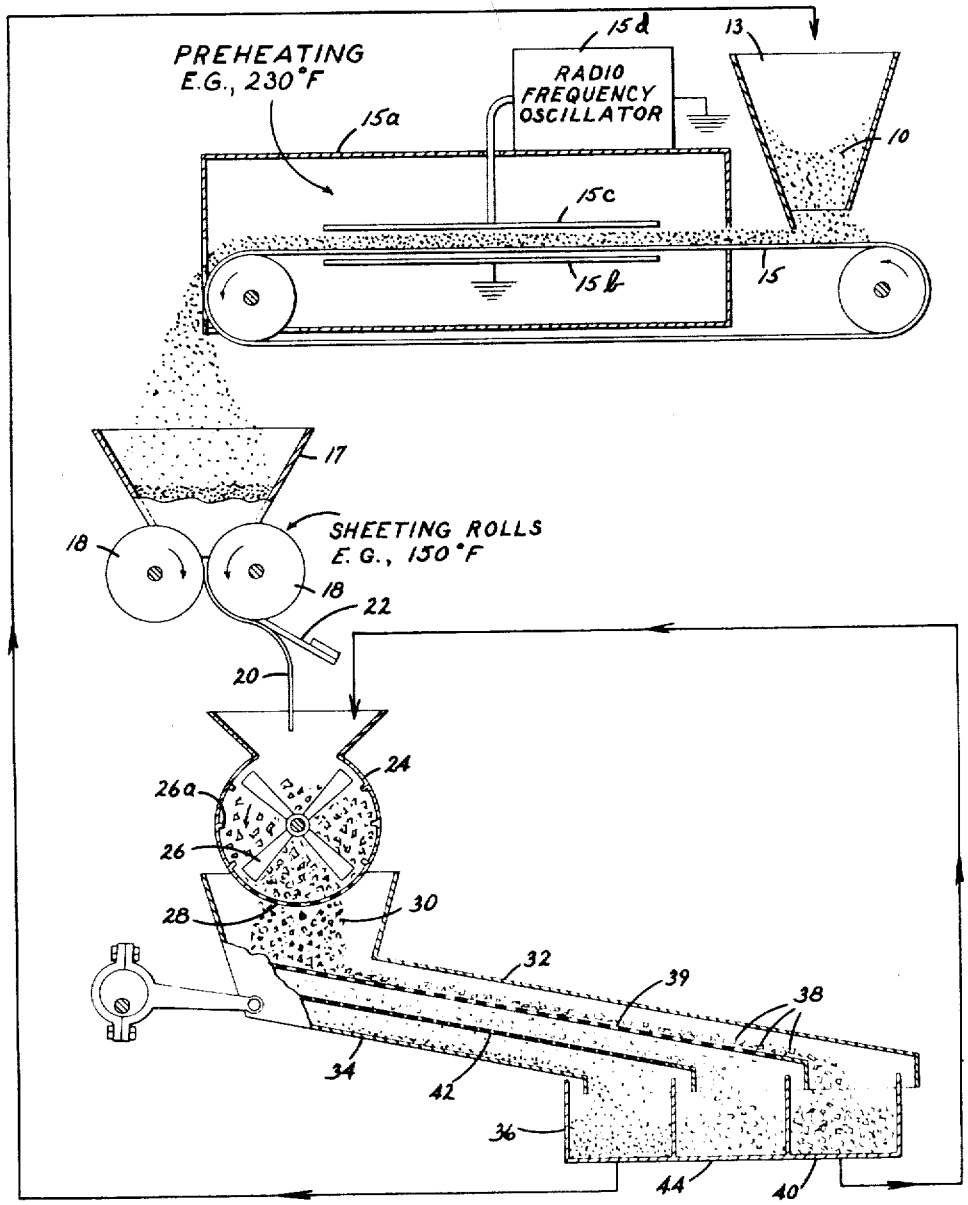

2,461,089

UNITED STATES PATENT OFFICE 2,461,089

PROCESS OF FORMING GRANULATED SYNTHETIC RESIN COMPOSITIONS

Leonard Smidth, New York, N. Y.

Application June 22, 1944, Serial No. 541,616

4 Claims. (Cl. 241—3)

The present invention relates to a process for the manufacture of granulated aminoplast thermosetting resin compositions; in particular, to an improved, continuous process for making granulated urea-formaldehyde molding compositions. The invention also relates to correlated improvements designed to improve the methods of making such granulated products and to enhance the properties of such compositions and the molded articles produced therefrom.

In methods heretofore employed for making granular molding materials, the dried resin composition is first reduced to a fine, fluffy powder by grinding the dried resin composition in a pebble or ball mill. The powder is then "densified" in a densifying apparatus, such as a Banbury mixer, and the densified material then comminuted by passing it through a cutting machine such as a rotary cutter to form a granular material of predetermined particle size. The granular material is then pressed into preforms or pills. Such standard commercial practices, however, require that the material be made in batch operations, in contrast to a "continuous" process, and although the time-cycle is rather short, the capacity of the Banbury mixer is limited. Hence the amount of granulated material that can be produced per unit batch is likewise limited and, moreover, successive batches are often non-uniform.

It was, therefore, a general object of the present invention to provide a process for overcoming the difficulties heretofore encountered in the manufacture of granulated aminoplast molding compositions.

It was a specific object of the present invention to provide a continuous process for the manufacture of granulated aminoplast molding compositions containing a filler.

It was another object of the present invention to provide granulated aminoplast molding compositions having particles of uniform density and which contained a minimum amount of fines.

Another object of the invention was to provide a method for making improved granular urea-formaldehyde compositions suitable for molding and which could be prepared in a continuous operation, in contrast to a batch process.

It was a further object of the invention to provide a method of producing granulated urea-formaldehyde molding compositions which upon being molded produced uniform products having improved physical properties and surface characteristics.

Therefore, in accordance with the present invention, there is provided in a process for making in a continuous manner an improved granulated aminoplast resin composition from a dry powder of an intermediate aminoplast resin composition, the steps comprising preheating said powder at a temperature sufficient to render the resin plastic but at a low pressure insufficient to harden the powder and insufficient to form the powder into a self-sustaining sheet, passing the preheated powder directly while still hot to a set of pressure rolls, redistributing the material as it passes to the pressure rolls, and then passing the redistributed material while still hot through the nip of the pressure rolls, in a single pass, maintained at a temperature lower than the temperature of the preheating step and at a higher pressure sufficient to form a loosely compacted self-sustaining sheet, the temperature and pressure during the sheeting step being insufficient to form any glossy areas in said sheet, stripping the sheet from the rolls, and granulating the sheeted materials. Thereafter, the granulated material may be screened to produce a product having a correlated density and particle size. The granulated material is particularly suitable for molding purposes, and is characterized by containing a minimum of fines in combination with a maximum of uniform particles, while at the same time having a desired optimum density.

In one preferred embodiment, there is provided a continuous process for forming a granulated aminoplast molding composition, wherein a fine, fluffy aminoplast powder is first preheated by passing the powder through a set of differential pressure rolls heated to a temperature sufficient to render the resin plastic but exerting a low pressure insufficient to harden the powder and insufficient to form a self-sustaining sheet, thereafter passing the preheated material through a redistributing and a heat-equalizing zone serving to feed the nip of a second set of differential pressure rolls which are maintained at an elevated temperature which is sufficient to form a loosely compacted self-sustaining sheet but is less than that of the preheating stage, stripping said sheet material from said rolls after a single pass, granulating the sheet material, stripping said sheet material from said rolls, granulating and then screening the granulated material to form a product having a correlated density and particle-size suitable for molding purposes, and finally reprocessing the rejected fines and lumps in the continuous process.

The aminoplast resins which may be used in forming the granular molding compositions of the present invention comprise amino-triazine-aldehyde resins such as melamine-formaldehyde resins, dicyandiamide-aldehyde resins, melamine-modified dicyandiamide-formaldehyde resins, urea-aldehyde resins, thiourea-urea-aldehyde resins, melamine-urea-formaldehyde resins, urea-aldehyde-ether resins, melamine-aldehyde-ether resins, and the like, as well as various mixtures as may be produced by mixing the separate resins, or by mixing therewith other aldehyde-reactive materials before or during condensation with an aldehyde.

I have found in the manufacture of granular aminoplast resin compositions which are suitable for molding purposes, for example, in the manufacture of urea-formaldehyde molding compositions, that in order to produce a material which after being sheeted by passage through the differential rolls and thereafter comminuted to form a predetermined granular size, it is essential that the granular product comprises a maximum amount of particles of relatively large size with a minimum or negative amount of fines while at the same time the material is maintained at the proper density.

The density of the granular material is determined by dividing the weight of the material by the volume. The "loose" density is determined by measuring a weighed sample in a graduate and tapping the graduate once or twice to level off the surface. The "packed" density is determined by tapping the graduate until a constant volume of material is reached, that is when the material no longer settles within the graduate. A suitable density of granular material is, for example, 0.550 when loose and 0.650 when packed.

The density of the granular composition does not depend solely upon the density of the sheeted material formed as a result of passing the preheated material through the differential rolls, but it also depends to a large extent upon the manner of distribution of the particle sizes in the mass. In general, the density of the sheeted material is controlled chiefly by the temperature, the pressure exerted by the rolls and speed of passage between the rolls.

If the pressure applied to the rolls is too great, the sheeted material produced will be too dense, and as a result the granular material produced therefrom, upon molding, will form a product having an undesirable "orange peel" surface effect.

For a more complete understanding of the nature and objects of the invention, reference should be had to the accompanying drawings in which, Figure 1 is a side elevation, partly in section, of one embodiment of suitable means for forming the granulated product of the present invention; and Figure 2 is a side elevation in cross-section of an alternative embodiment of means for forming the granular product.

In the ordinary manufacture of aminoplast molding compositions such, for example, as urea-formaldehyde molding compositions, the urea and formaldehyde are reacted in the usual manner to form a condensation product. A cellulose filler is combined with the liquid product before or after condensation but prior to drying, and the liquid mass containing the filler is then dried as by charging the material onto an apron dryer. After drying, the mass is ground in a pebble mill to the consistency of a fine, fluffy powder. Up to this point, the process substantially parallels the ordinary commercial methods followed in the manufacture of aminoplast molding powders. In accordance with the teachings of the present invention, however, a departure is now made from the ordinary procedure. In place of densifying the powder in a Banbury mixer in accordance with the teachings of the ordinary commercial practices, the powder is pre-heated, then formed into a loosely compacted self-sustaining sheet and the sheet thus formed then granulated, as hereinafter explained in detail.

Referring to Fig. 1 of the drawing, the fine, fluffy powder 10 as it comes from the pebble mill is charged into the hopper 12 and fed into the nip of a set of differential rolls 14. The differential rolls comprise two rollers which are run at different speeds, i. e., one roller rotated faster than the complementary roller cooperating therewith. The rollers are preferably internally heated to an elevated temperature in order to pre-heat the material, and the pressure maintained on the rollers is such that it is insufficient to cause the powder to harden or form a self-sustaining sheet as it is passed therethrough. The powder ordinarily loosely adheres to the rollers, and knife blades 16 are tangentially applied to the rollers in order to remove such adherent material and also to prevent the material from following the rolls through one complete revolution, thereby preventing the powder from becoming "worked" on said rolls. The material is redistributed as it falls into hopper 17 in which some temperature equalization occurs. The material is pre-heated sufficiently so that when a small amount of the mass is squeezed, it becomes somewhat doughlike and retains the shape of the hand but does not form hard lumps.

In order to facilitate passage of the powder through the first nip, one or both rollers 14 may be corrugated.

Instead of pre-heating the material between differential rolls, the fine, fluffy powder may be pre-heated by passing it through a heating chamber on an endless belt, or through an inclined kiln such, for example, as that used in making cement, or the powder may be subjected to electronic induction heating, but in all cases, the powder is pre-heated to a temperature lower than that which causes the material to harden.

In Figure 2 which is illustrative of this embodiment, the fine fluffy powder 10 as it comes from the pebble mill is charged into the hopper 13 and allowed to fall onto an endless belt 15 which carries the powder through a heating chamber 15a in which it may be heated by any suitable means, such as by electronic induction heating impressed through the electrodes 15b and 15c by the oscillator 15d. The preheated powder is permitted to fall off the end of the belt and is thereby redistributed as it descends into hopper 17 in which some temperature equalization occurs. The material is preheated sufficiently without application of pressure so that when a small amount of the mass is squeezed, it becomes somewhat doughlike and retains the shape of the hand but does not form hard lumps.

After preheating and redistribution, whether by the systems of Figures 1 and 2 or otherwise, the material is immediately passed through a set of differential pressure rolls 18, both of which may be internally heated, but in a preferred embodiment one roller is internally heated, as by means of hot water or steam, the other roller being substantially unheated aside from the amount of heat it picks up as a result of coming in contact with the preheated material. The hotter of the rolls is heated to or maintained at a temperature which is only sufficient to cause the preheated material to form a loosely compacted self-sustaining sheet under the pressure exerted thereon. As the material is passed through the differential rolls, the sheet material thus formed tends to adhere to the hotter roll. In order to prevent the material from being "worked" on the rolls, the sheet material 20 is stripped therefrom by means of knife edge 22 tangentially applied to the hotter of the rolls. It is essential that the material be stripped from the rolls in order to avoid "working." Hence, the material is necessarily removed or stripped from the rolls before it is permitted to follow the rolls through a complete revolution.

The densifying differential rolls are adjusted to a predetermined tension and spaced at such distance apart that the material, as it passes therethrough, forms a substantially self-sustaining loosely compacted sheet having the desired density. The density of the sheet is regulated by the amount of pressure applied to the rolls.

As the sheet material is stripped from the differential rolls it is passed into a granulating device, such as a cutter 24 having rotary knives 26 and stationary knives 26a. The cutter, which may be the conventional type known under the Ball and Jewell trade name, is equipped with a screen 28 in the bottom thereof so that as the material is cut it drops through the screen, as granulated particles 30, and onto a double-decked sifter 32 where the lumps and the fines are sifted and removed from the granular molding composition. The fines 34 falling through the double-decked sifter are collected in a suitable container 36, while the lumps 38 are prevented from passing therethrough and are collected in a second container 40. The granular molding composition retained on the lower screen 42 is collected in a suitable container 44 as it falls from the screen 42. The fines may be returned to the hopper 12 and mixed therein with the powder 10 for reprocessing, while the lumps collected in container 40 may be returned to the system by feeding into the cutter 24.

Regulation of the cutting operation has been found to be of considerable importance. A sheeted material, of such consistency as to have the proper density upon granulation, produced after passage through the second set of differential rolls is quite frangible, and unless proper precautions are taken during the cutting operation, is very easily reconverted to the undesirable powdered, fluffy state. For example, attempts were made to use a screen in combination with the cutter of a mesh which would pass granules no larger than the desired maximum size (e. g., about 10 mesh). In using a screen of such size however, it was found that an excessive amount of powder was produced. On the other hand, if the sheeted material was prepared having a density which, upon cutting, would pass through the screen of the cutter and still have the proper particle-size without forming the aforesaid excessive amount of powder, it was found that the granular material so formed produced the undesirable orange peel surface effect upon molding.

It was, therefore, found desirable to sharply control the cutting operation in order to maintain the desired balance, i. e., produce the maximum amount of granular material having the optimum particle-size without formation of the orange peel effect while at the same time producing a minimum amount of powder. When using a standard cutter for the comminuting operation and when the material thus cut was forced through the meshes of a screen integral with the cutter by operation of the rotary knives, it was found that the screen had to be sufficiently large so that the material readily dropped through the screen. On the other hand, it was found necessary to use a screen of such mesh that the material would not be squeezed through the screen or forced to revolve repeatedly within the apparatus before attaining the proper size to pass through the screen. If the screen employed was not sufficiently large, thus requiring a large portion of the material to repeatedly rotate, there was produced an undesirable excess of fine powder; but when a screen larger than the desired size was used to avoid the formation of an excess or fines, the resulting granular material contained a minor proportion of particles which were undesirably large. However, upon sifting the mass, such larger particles may be easily separated, returned to the cutter and reprocessed. Moreover, the resulting granular material was found to possess the desired density and particle-size correlated with the minimum amount of fines. If it is further desired to provide a granular material entirely free of fines, the fines may be removed by sifting the mass in a double-decked sifter, in which case both the larger particles and the fines are returned to the system for reprocessing.

Instead of using such larger screens, as above indicated, to control the particle-size so as to give the maximum amount of granules with a minimum amount of fines, other methods may be employed. For example, the cutter may be run at a slower speed, or there may be used a different type of cutter to accomplish the same purpose.

A suitable combination of particle-size in the granular material having a minimum amount of fines is a mass which comprises particles no larger than those which pass through a standard 10-mesh sieve, and wherein 55% of the original mass remains on a 20-mesh sieve, 75% of the original remains on a 40-mesh sieve, 83% remains on an 80-mesh sieve, and 91% on a 140-mesh sieve; the remainder (9%) being a powder finer than that which passes through a 140-mesh sieve.

Of course, it will be understood that the above process is capable of modification by varying the speed of the rolls, the temperature of the rolls, the clearance between the rolls and the relation of temperature and pressure between the two sets of the rolls.

By way of illustration but not by way of limiting the invention, the following examples are given:

*Example I*

A urea-formaldehyde condensate containing a filler was prepared in accordance with my disclosure in U. S. Patent No. 2,338,464, issued January 4, 1944, dried, and then ground in a ball mill or other apparatus until it was reduced to a fine fluffy powder.

The powder was then pre-heated by passing it through a set of differential rolls, the temperature on the fast roll being adjusted to about 240–250° F., while the temperature on the slower roll was 220° F. and the rolls being maintained at 0.30 inch apart. The pre-heated material in powder form was then immediately allowed to fall through a redistribution zone into and through the nip of a second set of differential rolls, the temperature of both the fast and the slow rolls being maintained at approximately 140° F. and the rolls exerting a relatively higher pressure, i. e. the space between these latter rolls being less than that between the first set of rolls so as to form a sheet. The material as it passed through the second set of differential rolls formed a loosely compacted self-sustaining sheet approximately ⅛ of an inch thick. The sheeted material as it was scraped from the differential rolls did not show any glossy areas which would otherwise be indicative of having too much pressure and temperature applied thereto. The sheet was scraped off the hotter roll and passed into a cutter and, upon being cut, dropped through a screen located at the bottom thereof. The granular material was then screened by means of a double-decked sifter and the granular molding composition thus separated from the lumps and fines. Upon molding, the molded product was substantially free of undesirable orange peel effects. Moreover, the granular molding composition formed pellets and preforms which were homogeneous and did not readily break apart.

*Example II*

A melamine-formaldehyde resin was prepared by reacting 240 parts of formalin (37% formaldehyde by weight) with 126 parts of melamine at a pH of 6.8. The mixture was reacted at about 65° C. for approximately 70 minutes, at the end of which time the pH was about 7.5. A cellulose filler in the form of wood flour was mixed with the liquid mass and the mass then dried in an oven at about 75° C. for approximately 20 minutes. The dried material was then ground in a ball mill until it was reduced to a fine, fluffy powder. The powder was then pre-heated by passing it during a period of several minutes through a heating chamber on an endless belt, as illustrated in Figure 2, the temperature of the chamber being maintained at about 230° F. As the material in uncompacted form was removed from the oven it was then immediately allowed to fall through a redistribution zone into and through the nip of a set of differential rolls, the temperature of the fast roll being maintained at approximately 150° F., and having an applied tension sufficient to form a lightly compacted self-sustaining sheet approximately ⅛ of an inch thick. The sheeted material was scraped from the rolls without permitting the material to follow the rolls through a complete revolution. As the said material was removed from the rolls, it was dropped into a cutter where it was cut into granules and dropped through a screen located in the bottom thereof. The granular material was then screened on a double-decked sifter and the granular molding composition thus separated from the lumps and fines. Articles molded therefrom had a uniform surface appearance and were substantially free of any undesirable orange peel effect. Preforms and pellets formed from such granular molding composition were durable, uniform and did not readily break apart.

It was found very desirable to incorporate a mold lubricant, such as zinc stearate, with the resin material prior to or during the processing operation on the rolls in order to prevent the material from sticking to the rolls. The use of such lubricant also provides a suitable lubricant for subsequent molding operations, but the use of too much lubricant prevents adhesion of the material to the rolls. Adhesion is necessary for proper sheeting of the composition. Not more than 0.5% by weight of such lubricant and preferably less should be used, depending upon the nature of the composition, the kind of filler used, the amount of filler, the flow, and the moisture content. In place of or in addition to zinc stearate, there may be employed other water-soluble and/or organic solvent-soluble lubricants initially, during reaction, or after drying the resin composition as, for example, during the steps of grinding and comminuting.

In order to accelerate the cure of the composition during molding, various latent catalysts may be formed in situ or combined with the resin composition prior to, during or after granulating. Coloring matter may be added at any stage of the process before or after forming the granular composition. Similarly, various fillers may be added to the composition at any of the various stages such, for example, as wood flour, alpha cellulose, paper, cotton, canvas, asbestos, mica flakes, pearl shell chips, synthetic or natural filaments, glass fibres, fabrics and the like.

The granular molding compositions may be used for molding buttons, clock cases, radio cabinets, dishes, various household utensils and other articles.

Many advantages arise from utilizing the process of the present invention, one of the most important being the production of large quantities of a granular aminoplast molding composition of uniform density and particle size, in contrast to those granular compositions made by the batch processes. The present process, moreover, being of a continuous nature, results in a substantial saving in time, labor and equipment.

Since certain changes in carrying out the above process and certain modifications in the composition which embody the invention may be made without departing from its scope, it is intended that all matter contained in the above description shall be interpreted as illustrative and not in a limiting sense.

Having described my invention, what I claim as new and desire to secure by Letters Patent is:

1. In a continuous process for making an improved granular aminoplast resin composition for molding, the steps comprising preheating a powdered aminoplast molding composition by passing the powder through a set of pressure rolls at an elevated temperature but at a relatively low pressure so that the material remains in loose, unsheeted form, thereafter passing the preheated material while hot through a second set of pressure rolls which are maintained at a relatively lower temperature but exerting a relatively higher pressure than said first set of pressure rolls to form said material into a self-sustaining sheet, and thereafter granulating said sheet material.

2. In a continuous process for making an improved granular aminoplast resin composition for molding, the steps comprising preheating a powdered aminoplast molding composition by passing the powder through a set of pressure rolls at an elevated temperature but at a relatively low pressure so that the material remains in loose, unsheeted form, thereafter passing the preheated material while hot through a second set of pressure rolls which are maintained at a relatively lower temperature but exerting a relatively higher pressure than said first set of pressure rolls to form said material into a self-sustaining sheet, one of said second set of rolls being maintained at a higher temperature than the other roll, whereby said material is formed into a self-sustaining sheet which adheres to the hotter roll, stripping said sheet from the hotter roll, and thereafter granulating said sheet material.

3. In a continuous process for making, from a dry powder of an intermediate aminoplast resin composition, an improved granular aminoplast resin composition for molding comprising preheating a powdered aminoplast molding composition at a temperature sufficient to render the resin plastic, but at a pressure between atmospheric and a low gage pressure, insufficient to harden the powder and insufficient to form the powder into a self-sustaining sheet; passing said preheated material from the preheating zone while still in unsheeted form directly while still hot to a set of pressure rolls, redistributing the material as it passes to the pressure rolls, and then passing the redistributed material while still hot through the nip of the pressure rolls in a single pass at a temperature less than that of the preheating stage and at a higher pressure sufficient to form a loosely compacted self-sustaining sheet, the temperature and pressure during the sheeting step being insufficient to form any glossy areas in said sheet, and thereafter granulating said sheet material.

4. The process of claim 3 in which the powder is carried through the preheating stage under substantially atmospheric pressure whereby the powder leaves the preheating stage in essentially uncompacted form.

LEONARD SMIDTH.

REFERENCES CITED

The following references are of record in the file of this patent:

UNITED STATES PATENTS

| Number | Name | Date |
|---|---|---|
| Re. 10,965 | Oliver | Oct. 30, 1888 |
| 1,049,712 | Helbig | Jan. 7, 1913 |
| 2,109,592 | Macht et al. | Mar. 1, 1938 |
| 2,217,163 | Fletcher | Oct. 8, 1940 |
| 2,235,324 | Moreland | Mar. 8, 1941 |
| 2,297,505 | Schmidberger | Sept. 29, 1942 |
| 2,316,283 | Piperoux et al. | Apr. 13, 1943 |
| 2,339,607 | Smith | Jan. 18, 1944 |

OTHER REFERENCES

"Plastice in Engineering," by J. Delmonte, pp. 294–295, published by Penton Publishing Co., Cleveland, 1940, copy found in Division 15 of this office.